United States Patent
Chen et al.

(10) Patent No.: US 9,639,729 B2
(45) Date of Patent: May 2, 2017

(54) ARRANGEMENT FOR AND METHOD OF IMAGING TARGETS WITH IMPROVED LIGHT COLLECTING EFFICIENCY OVER EXTENDED RANGE OF WORKING DISTANCES

(71) Applicant: SYMBOL TECHNOLOGIES, LLC, Lincolnshire, IL (US)

(72) Inventors: Caihua Chen, Albany, NY (US); Chinh Tan, Setauket, NY (US)

(73) Assignee: Symbol Technologies, LLC, Holtsville, NY (US)

(\*) Notice: Subject to any disclaimer, the term of this patent is extended or adjusted under 35 U.S.C. 154(b) by 0 days.

(21) Appl. No.: 14/728,185

(22) Filed: Jun. 2, 2015

(65) Prior Publication Data

US 2016/0358001 A1 Dec. 8, 2016

(51) Int. Cl.
| | |
|---|---|
| G02B 9/34 | (2006.01) |
| G06K 7/10 | (2006.01) |
| G02B 3/14 | (2006.01) |
| G02B 26/00 | (2006.01) |
| G02F 1/29 | (2006.01) |

(52) U.S. Cl.
CPC ............ G06K 7/10811 (2013.01); G02B 3/14 (2013.01); G02B 9/34 (2013.01); G02B 26/005 (2013.01); G06K 7/10722 (2013.01); G06K 7/10732 (2013.01); G06K 7/10831 (2013.01); *G02F 2001/294* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,864,436 A | * | 1/1999 | Noyes | ............ G02B 9/16 356/3 |
| 7,173,774 B2 | * | 2/2007 | Ning | ............ G02B 13/006 359/716 |
| 7,619,204 B2 | * | 11/2009 | Vinogradov | ............ G02B 3/14 235/462.35 |

(Continued)

FOREIGN PATENT DOCUMENTS

GB             22607 A        0/1894

OTHER PUBLICATIONS

International Search Report and Written Opinion from corresponding International Patent Application No. PCT/US2016/026667 mailed on Jun. 17, 2016.

*Primary Examiner* — Christle I Marshall

(57) ABSTRACT

An imaging lens assembly for an imaging reader includes a base lens having an optical power, a target side facing a target, and an imager side facing an imager. An aperture stop directly contacts the imager side and has an aperture through which return light from the target passes. The aperture is magnified in apparent size by the optical power of the base lens to form a magnified entrance pupil as seen through the target side. A variable focus liquid lens focuses the return light captured by the magnified entrance pupil over an extended range of working distances onto the imager. The magnified entrance pupil captures more of the return light from the target to pass through the base lens and the liquid lens to the imager, and also allows the target to be illuminated with a lower brightness to conserve electrical power.

20 Claims, 6 Drawing Sheets

(56) References Cited

U.S. PATENT DOCUMENTS

| | | | | |
|---|---|---|---|---|
| 8,451,368 B2* | 5/2013 | Sung | ................... | H04N 5/23212 |
| | | | | 348/340 |
| 8,502,130 B2* | 8/2013 | Tay | ................... | H01L 27/14621 |
| | | | | 250/208.1 |
| 8,970,780 B2* | 3/2015 | Wang | ................... | H04N 5/2257 |
| | | | | 348/374 |
| 2008/0239509 A1 | 10/2008 | Vinogradov | | |
| 2008/0296385 A1* | 12/2008 | Vinogradov | ....... | G06K 7/10811 |
| | | | | 235/462.22 |
| 2009/0166543 A1 | 7/2009 | Vinogradov | | |
| 2015/0293370 A1* | 10/2015 | Suzuki | ............... | G02B 27/4211 |
| | | | | 359/570 |

* cited by examiner

ARRANGEMENT FOR AND METHOD OF IMAGING TARGETS WITH IMPROVED LIGHT COLLECTING EFFICIENCY OVER EXTENDED RANGE OF WORKING DISTANCES

BACKGROUND OF THE INVENTION

The present disclosure relates generally to an arrangement for, and a method of, electro-optically reading targets by image capture and, more particularly, to an imaging lens assembly having a magnified entrance pupil for capturing return light from a target with an improved light collecting efficiency over an extended range of working distances in a field of view of a solid-state imager of an imaging reader, and for projecting the captured return light onto the imager during reading of the target.

Solid-state imaging systems or imaging readers have been used in many industries, such as retail, manufacturing, warehousing, distribution, postal, transportation, logistics, etc., to image various symbol targets, such as one- and two-dimensional bar code symbols to be electro-optically decoded and read by image capture. A known imaging reader includes a solid-state imager, e.g., a one- or two-dimensional charge coupled device (CCD) or a complementary metal oxide semiconductor (CMOS) device, having a sensor array of photocells or light sensors that correspond to image elements or pixels over a field of view of the imager, and associated circuits for producing and processing electrical signals that are processed by a programmed microprocessor or controller into data indicative of the target being decoded and read. The imaging reader also includes an illuminating light assembly for illuminating the target, and an imaging lens assembly for capturing return light scattered and/or reflected from the illuminated target, and for projecting the captured return light onto the sensor array to capture an image of the illuminated target during an exposure time period.

A known imaging lens assembly comprises a plurality or group of lenses of different optical powers, such as a classical Cooke triplet having a center lens between a pair of side lenses, and an aperture stop located between one of the side lenses and the center lens. In order to image targets that can be located over a wide range of working distances relative to the reader, it is known to move the lens group, for example, with a voice coil motor, to automatically focus the target between a near position close to the reader and a far position further away from the reader. However, this mechanical lens movement is disadvantageous for several reasons. First, the mechanical lens movement generates vibrations which, in the case of a handheld reader, may be propagated through the reader to the user's hand, may generate dust to obscure the lenses, and may generate an objectionable, annoying, audible hum. In addition, the voice coil motor is very susceptible to hand motion, consumes electrical power, is expensive and notoriously slow, can be unreliable, occupies space, and increases the overall weight, size and complexity of the reader.

It is also known to use a variable focus liquid lens for the imaging lens assembly. The liquid lens uses a fluid to create a variable focus lens without any moving parts by controlling the curvature of an outer surface (meniscus) of the fluid. Although the liquid lens focuses faster than a lens that is mechanically moved, the liquid lens has a small entrance pupil limited by its available, small active area on the meniscus. As a result, the liquid lens has a low light collecting efficiency and requires the illuminating light assembly to emit illumination light with a higher intensity or brightness to compensate for the poor light collection, together with a concomitant consumption of extra electrical power. Bright illumination shining out of the reader can be annoying or uncomfortable to an operator, or to other persons nearby the reader. Moreover, the liquid lens by itself has a very limited optical power, thereby restricting the working distance range.

Accordingly, it would be desirable to provide a compact, lightweight and inexpensive, imaging lens assembly with an enlarged entrance pupil and an improved light collecting efficiency, which can rapidly focus on both one- and two-dimensional targets to be read by an imaging reader, especially a handheld reader useful in portable and mobile applications where size, weight and cost are at a premium, over an extended range of working distances, without requiring any annoying bright illumination to be generated or excess illumination power to be consumed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
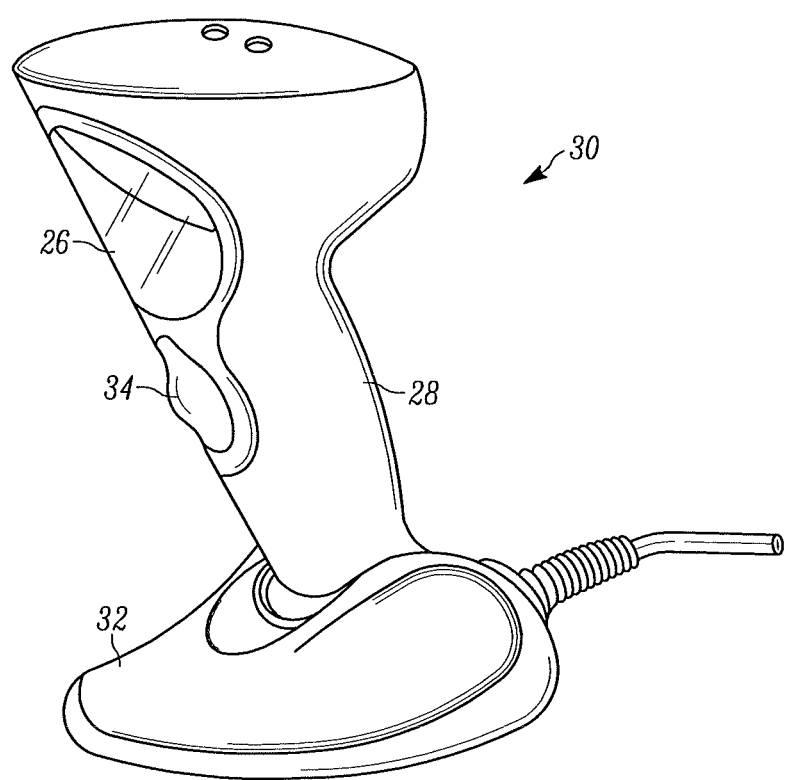
FIG. 1 is a perspective view of an imaging reader operative in either a handheld mode, or a hands-free mode, for capturing return light from targets.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging lens assembly captures return light from a target, e.g., a bar code symbol, over a field of view of an array of image sensors of a solid-state imager, and projects the captured return light onto the array during electro-optical reading of the target. The imaging lens assembly includes a base lens through which the captured return light passes along an optical axis. The base lens is preferably configured of a plurality or group of lenses arranged along the optical axis. The base lens has an optical power, a target side facing the target, and an imager side facing the imager. The imaging lens assembly also includes an aperture stop in direct surface area contact with the imager side of the base lens. The aperture stop has an aperture through which the optical axis extends and the captured return light passes. The aperture is magnified in apparent size by the optical power of the base lens to form a magnified entrance pupil as seen through the target side. The imaging lens assembly further includes a variable focus liquid lens arranged along the optical axis between the aperture stop and the imager for focusing a substantial amount of the return light captured by the magnified entrance pupil over an extended range of working distances onto the imager. Since the magnified entrance pupil captures more of the return light, more of the return light passes through the base lens and the liquid lens to the imager, thereby increasing the light collecting efficiency of the imaging lens assembly.

In accordance with another feature of this disclosure, a method of imaging a target to be electro-optically read by capturing return light from the target over a field of view of an array of image sensors of a solid-state imager, and by projecting the captured return light onto the array, is performed by passing the captured return light along an optical axis through a base lens having an optical power, a target side facing the target, and an imager side facing the imager. The method is further performed by contacting an aperture stop having an aperture through which the optical axis extends and the captured return light passes in direct surface area contact with the imager side of the base lens, and by magnifying the aperture in apparent size by the optical power of the base lens to form a magnified entrance pupil as seen through the target side. The method is further performed by focusing, with a variable focus liquid lens, a substantial amount of the return light captured by the magnified entrance pupil over an extended range of working distances onto the imager. Again, the magnified entrance pupil allows more of the return light to pass through the base lens and the liquid lens to the imager.

Turning now to the drawings, reference numeral 30 in FIG. 1 generally identifies an imaging apparatus or reader having a light-transmissive window 26 and a gun-shaped housing 28 supported by a base 32 for supporting the imaging reader 30 on a countertop or like support surface. The imaging reader 30 can thus be used in a hands-free mode as a stationary workstation in which products bearing, or associated with, targets are slid or swiped past, or presented to, the window 26, or can be picked up off the countertop and held in an operator's hand and used in a handheld mode in which the reader is moved, and a trigger 34 is manually depressed to initiate imaging of a target, especially one- or two-dimensional symbols, to be read at a working distance from the window 26. In another variation, the base 32 can be omitted, and housings of other configurations can be employed. For example, the housing can be configured as a vertical slot scanner having a generally vertically arranged, upright window, or as a flat-bed or horizontal slot scanner having a generally horizontally arranged window, or as a bi-optical, dual window scanner having both generally horizontally and vertically arranged windows. A cable, as illustrated in FIG. 1, connected to the base 32 can also be omitted, in which case, the reader 30 communicates with a remote host by a wireless link, and the reader 30 is electrically powered by an on-board battery.

Figure 2:
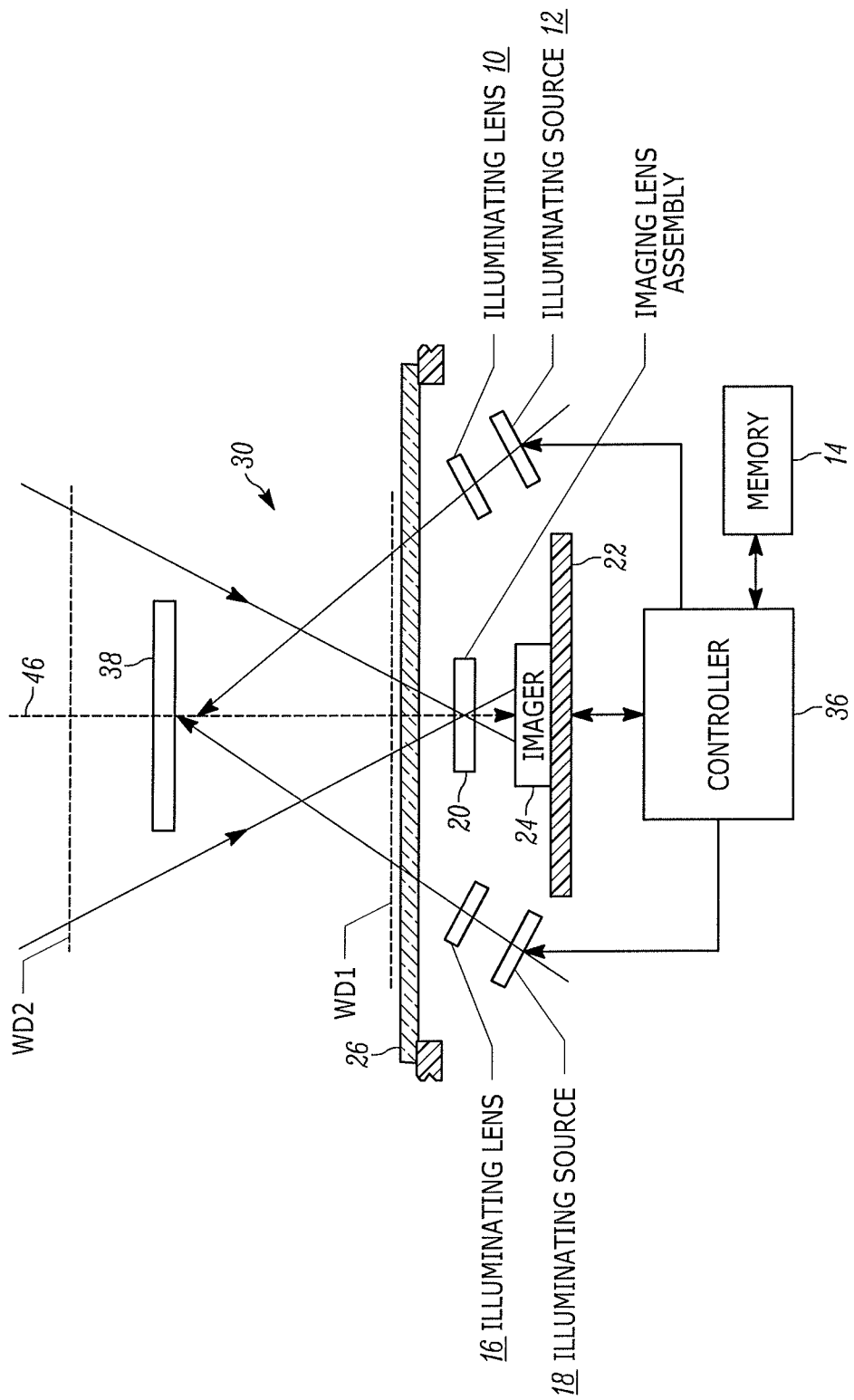
FIG. 2 is a schematic diagram of various components of the reader of FIG. 1.

As schematically shown in FIG. 2, an imager or imaging sensor 24 is mounted on a printed circuit board 22 in the reader 30. The imaging sensor 24 is a solid-state device, for example, a CCD or a CMOS imaging sensor having a one- or two-dimensional array of addressable image sensors or pixels, arranged in a single, linear, one-dimensional row, or in a plurality of mutually orthogonal rows and columns, preferably a megapixel array, and operative for detecting return light captured by an imaging lens assembly 20 along an optical path or optical axis 46 that extends through the window 26. The return light is scattered and/or reflected from a target or symbol 38 as pixel data over a field of view. The imaging lens assembly 20 is operative for focusing and projecting the return light onto the array of image sensors to enable the target 38 to be read. The target 38 may be located anywhere in a range of working distances between a close-in working distance (WD1) and a far-out working distance (WD2). In a preferred embodiment, WD1 is about four to six inches from the imaging sensor 24, and WD2 can be many feet from the window 26, for example, around fifty or more feet away.

An illuminating light assembly is also mounted in the imaging reader 30 and preferably includes an illuminator or illuminating light sources 12, 18, e.g., light emitting diodes (LEDs), and corresponding illuminating lenses 10, 16 to uniformly illuminate the target 38 with an illuminating light having an intensity level or brightness over an illumination time period. The light sources 12, 18 are preferably pulsed.

As shown in FIG. 2, the imaging sensor 24 and the illuminating light sources 12, 18 are operatively connected to a controller or programmed microprocessor 36 operative for controlling the operation of these components. Preferably, the microprocessor 36 is operative for processing the return light from the target 38, and for decoding the captured target image when the target 38 is a symbol. A memory 14 is accessible by the controller 36 for storing and retrieving data.

In operation, the controller 36 sends a command signal to pulse the illuminating light sources 12, 18 for the illumination time period, say 500 microseconds or less, and energizes and exposes the imaging sensor 24 to collect light, e.g., illumination light and/or ambient light, from the target 38 during an exposure time period. A typical array needs about 16-33 milliseconds to acquire the entire target image and operates at a frame rate of about 30-60 frames per second.

Figure 3:
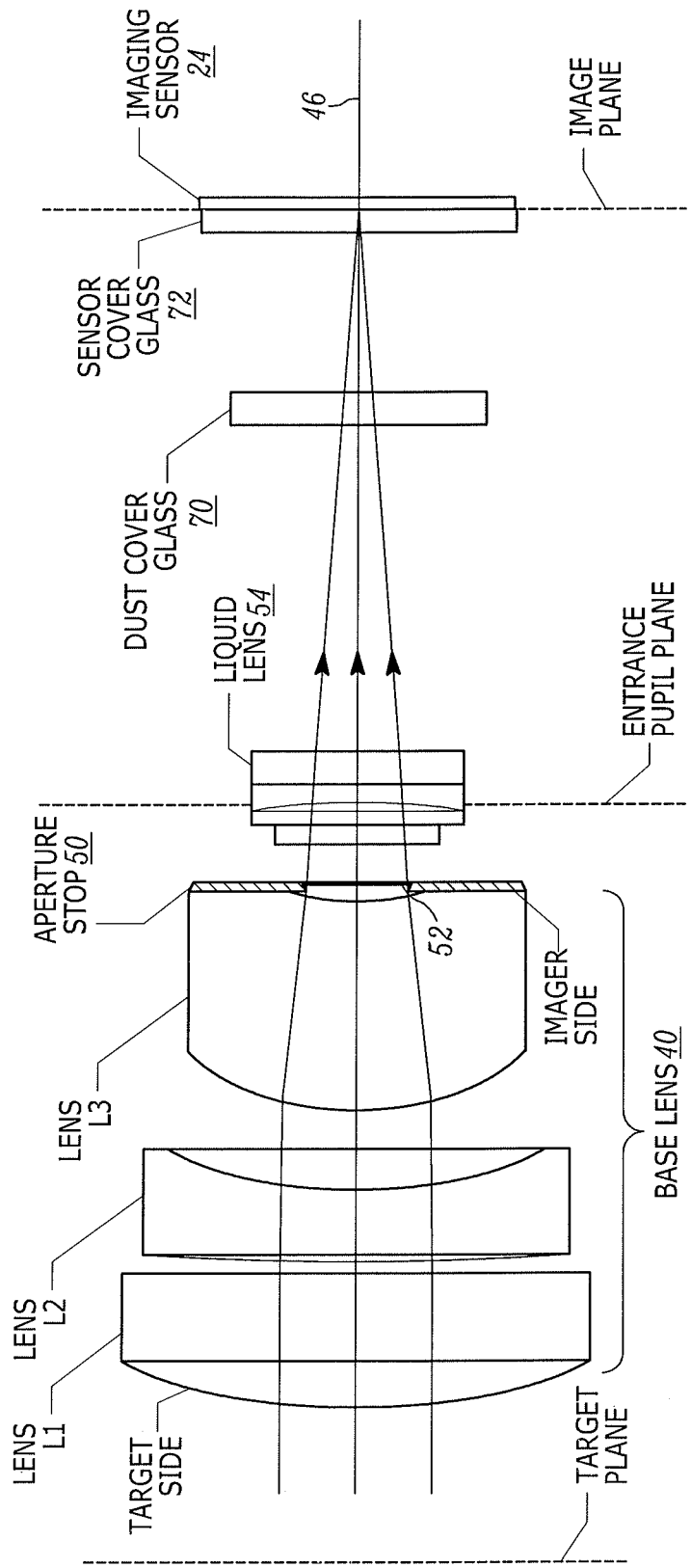
FIG. 3 is a part-sectional, part-diagrammatic view of an imaging lens assembly in accordance with this disclosure for use in the reader of FIG. 1.
Figure 4:
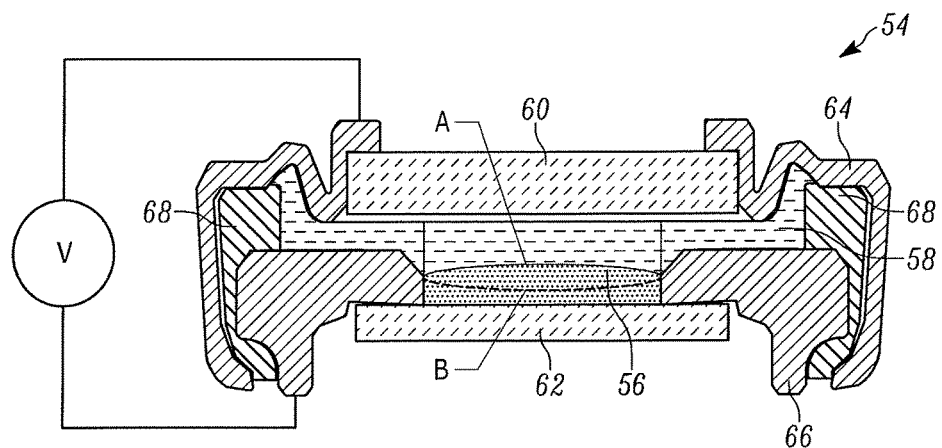
FIG. 4 is an enlarged, sectional view of a liquid lens of the imaging lens assembly of FIG. 3.
Figure 5:
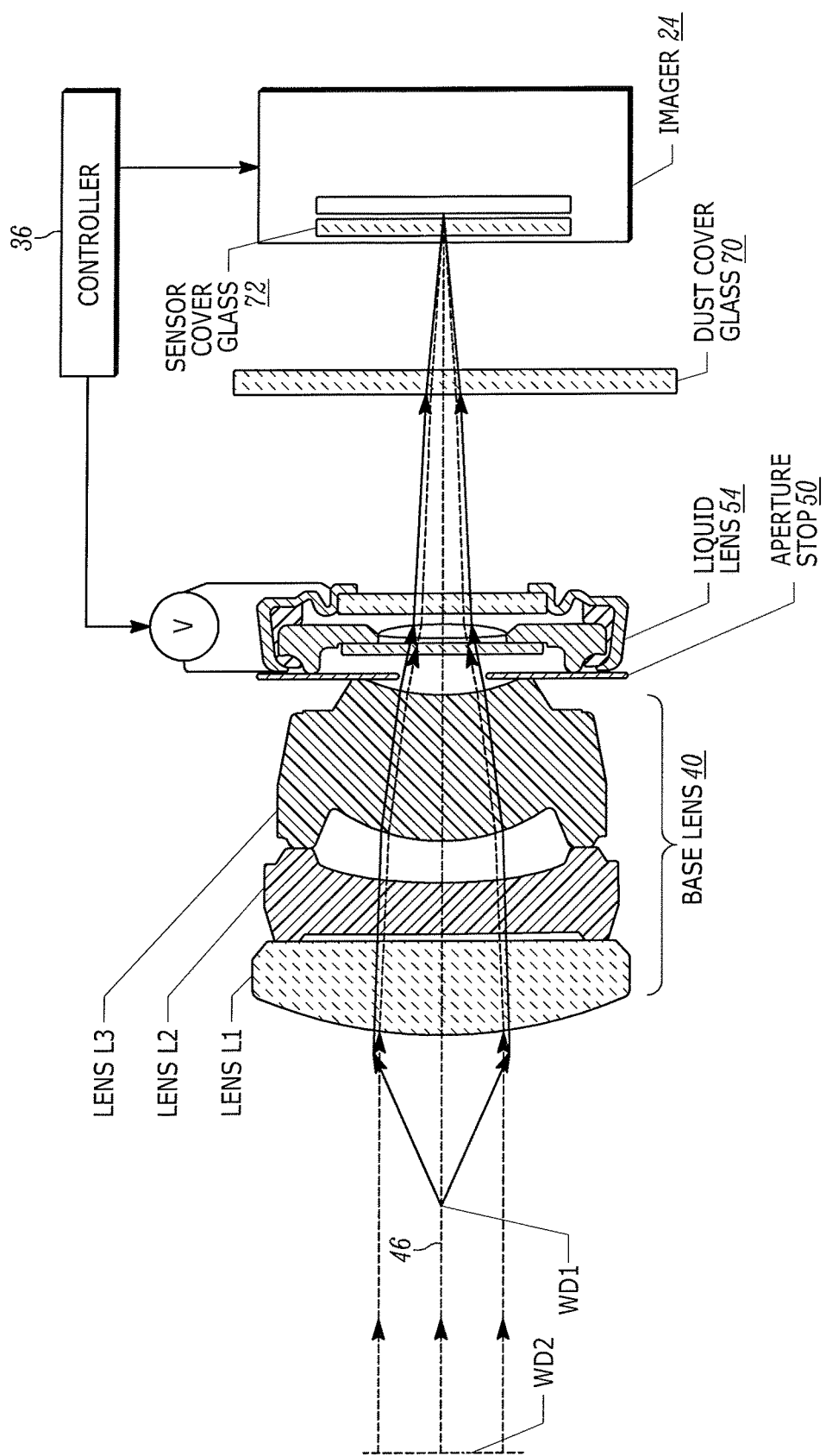
FIG. 5 is a part-sectional, part-diagrammatic view of a preferred embodiment of an imaging lens assembly analogous to the imaging lens assembly of FIG. 3 in use.

In accordance with one aspect of this disclosure, as shown in FIGS. 3-5, the imaging lens assembly 20 provided in the reader 30 includes a base lens 40 through which the captured return light passes along the optical axis 46. As shown, the base lens 40 includes a plurality or group of first, second, and third lenses L1, L2, and L3 arranged successively along the optical axis 46. The second lens is located between the first and third lenses. As shown in FIG. 3, the base lens has a target side facing the target located in a target plane (towards the left), and an imager side facing the imager 24 located in an image plane (towards the right). The base lens 40 has an overall optical power that combines a positive optical power for the first lens, a negative optical power for the second lens, and a positive optical power for the third lens.

The imaging lens assembly 20 further includes an aperture stop 50 in direct surface area contact with the imager side of the base lens, i.e., the aperture stop 50 is mounted on the imager-facing surface of the third lens L3. The aperture stop 50 has a physical aperture 52 through which the optical axis 46 extends and the captured return light passes. The aperture stop 50 is preferably configured as a discrete optical component. The aperture 52 is preferably symmetrical, e.g., circular, but may be asymmetrical, e.g., a rectangular or elliptical aperture. As described below, the aperture 52 is magnified in apparent size by the optical power of the base lens 40 to form a magnified entrance pupil as seen through the target side. The magnified entrance pupil is located on the entrance pupil plane shown in FIG. 3.

The imaging lens assembly 20 further includes a variable focus liquid lens 54 arranged along the optical axis 46 between the aperture stop 50 and the imager 24 for focusing the return light captured by the magnified entrance pupil over an extended range of working distances on the imager 24. As best seen in FIG. 4, the liquid lens 54 has a housing in which a first liquid 56, shown in droplet form, and a second liquid 58 are arranged along the optical axis 46. The liquids 56, 58 are light-transmissive, immiscible, of different optical indicies of refraction, and of substantially the same density. The liquid or drop 56 is constituted of an electrically insulating substance. For example, an oil, an alcane, or a blend of alcanes, preferably halogenated, or any other insulating liquid may be used for the drop 56. The liquid 58 is constituted of an electrically conductive substance, for example, water loaded with salts (mineral or other), or any other liquid, organic or not, and preferably made conductive by the addition of ionic components.

The housing of the liquid lens 54 includes a pair of spaced-apart, generally planar windows 60, 62, each constituted of an electrically insulating, light-transmissive, material, such as glass. The window 60 extends across an annular body cap 64, and the window 62 extends across an annular body cone 66. The cap 64 and the cone 66 are each constituted of an electrically conductive material, such as metal. The windows 60, 62, the cap 64 and the cone 66 together bound an interior in which the liquids 56, 58 are contained. A rubber gasket 68 seals the liquids 56, 58 in said interior.

A voltage source V is connected to the conductive cap 64 and the conductive cone 66, which serve as electrodes. When a voltage is applied across the electrodes, an electrical field is created which alters the shape of the drop 56. With a relatively higher voltage applied, the drop 56 deforms to the generally hemispherical shape shown in solid lines in FIG. 4, and its outer surface "A" is convex. When a relatively lower voltage is applied, the drop 56 deforms and takes the shape shown in dashed lines in FIG. 5, and its outer surface "B" is concave. This deformation of the drop changes the focus of the liquid lens 54 and is employed by the present disclosure to read the target 38 over an extended range of working distances. More particularly, the convex surface "A" is used to read close-in targets located at WD1, and the concave surface "B" is used to read far-out targets located at WD2.

Returning to FIG. 3, an optional dust cover glass 70 may be arranged along the optical axis 46 between the liquid lens 54 and the imager 24, and is located remotely from the imager 24. The imager 24 has its own sensor cover glass 72, and the dust cover glass 70 is an extra measure of protection. The dust cover glass 70 prevents any dust generated during manufacture and assembly from falling on the sensor cover glass 72 and generating blemishes in the captured image. In addition, one of the surfaces of the dust cover glass 70 has an anti-infrared (IR) coating to avoid ambient IR light from reaching the imager 24 and adversely affecting image quality since the imaging lens assembly is not IR-corrected. The anti-IR coating can be on either surface of the dust cover glass 70 and thus requires no Poka-Yoke feature for assembly in manufacture.

In the preferred embodiment, the first lens L1 has a spherical surface, and the second and third lenses L2 and L3 each has an aspherical surface. The first lens L1 is made of a high index, low dispersion, crown-type, glass material. The second lens L2 is made of a high index, high dispersion, flint-type, plastic material. The third lens L3 is made of low index, low dispersion, crown-type, plastic material. The first lens L1 has a convex-flat/concave shape with the target-facing surface, or both surfaces, bending toward the aperture stop 50. The second lens L2 has a concave/flat-concave shape with the imager-facing surface bending toward the aperture stop 50. The third lens L3 has a convex-concave shape with both surfaces bending toward the aperture stop 50. Advantageously, for the first lens L1, $\Phi<\Phi 1<1.2\Phi$, where $\Phi$ is the optical power of the overall imaging lens assembly, and where $\Phi 1$ is the optical power of the first lens L1. If $\Phi 1<\Phi$, then aberration would be hard to correct in general. If $\Phi 1>1.2\Phi$, then thermal compensation becomes difficult in general. For the second lens L2, $-1.2\Phi<\Phi 2<-\Phi$, where $\Phi$ is the optical power of the overall imaging lens assembly, and where $\Phi 2$ is the optical power of the second lens L2. If $\Phi 2>-\Phi$, then aberration would be hard to correct in general. If $\Phi 2<-1.2\Phi$, then thermal compensation becomes difficult in general. For the third lens L3, $\Phi<\Phi 3<1.2\Phi$, where $\Phi$ is the optical power of the overall imaging lens assembly, and where $\Phi 3$ is the optical power of the third lens L3. If $\Phi 3<\Phi$, then aberration would be hard to correct in general. If $\Phi 3>1.2\Phi$, then thermal compensation becomes difficult in general.

To minimize spherical aberration, the following conditions have to be satisfied: L1R2>L1R1>0 and 1.5<L1R2/L1R1, where L1R1 and L1R2 are the radius of curvature of the target-facing surface and the imager-facing surface of the first lens L1, respectively. To minimize spherical, coma, astigmatism, and distortion aberrations in general, the following conditions have to be satisfied: L2R1<L2R2<0, L2R1/L2R2>5, where L2R1 and L2R2 are the radius of curvature of the target-facing surface and the imager-facing surface of the second lens L2, respectively; and L3R2>L3R1>0, 1<L3R2/L3R1<3, where L3R1 and L3R2 are the radius of curvature of the target-facing surface and the imager-facing surface of the third lens L3, respectively.

To minimize the spherical and field curvature, the following condition has to be satisfied: T3>0.15EFL, where T3 is the thickness of the third lens L3, and EFL is the system effective focal length. To allow room to assemble the liquid lens 54 and the dust cover glass 70, the following condition has to be satisfied: Tb>0.5 EFL, where Tb is the distance between the aperture stop 50 and the imager 24, and EFL is the system effective focal length. To best correct color aberration, the following condition has to be satisfied: 0.15 mm<T12<0.3 mm, where T12 is the air gap between the lenses L1 and L2. If T12<0.15 mm, then it would be difficult to assemble lenses L1 and L2 in manufacture. If T12>0.3 mm, then color aberration would be difficult to correct.

In a preferred embodiment, the physical aperture 52 has a diameter of about 1.7 mm, which is defined by the active area of the liquid lens 54. The optical power of the base lens 40 magnifies the aperture 52 in apparent size to form a magnified entrance pupil having a diameter of about 3 mm at the entrance pupil plane (see FIG. 3) that is displaced from the aperture stop 50. The optical power of the base lens 40 can range between about 50 diopters to about 70 diopters, and the preferred optical power of the base lens 40 is about 60 diopters. The entrance pupil is a virtual, optical image of the aperture 52 as seen through the target side of the base lens 40. Since the magnified entrance pupil is about two times larger in diameter as compared to the diameter of the aperture 52, the light collecting efficiency of the imaging lens assembly is improved by about a factor of four. In addition, there is about a four-fold reduction in the amount of electrical power consumed by the illuminating light sources 12, 18, because the emitted illumination light need not be so bright due to the fact that more of the return light from the target is captured and delivered via the base lens 40 and the liquid lens 54 to the imager 24. Since the illumination light need not be so bright, it will less disturbing to operators and others.

To cover the extended working distance (depth of field) from a few inches up to fifty and more feet, the liquid lens 54 need only be adjusted from about 10 diopters to about −5 diopters, and this requires that the voltage of the source V be varied by about 6 v. With this voltage variation, the overall system effective focal length varies from about 15 mm to about 18 mm, and the system f-number varies from about 5 to about 6, and the response time of the liquid lens 54 is on the order of 10 ms. It can be shown that $\Phi = \Phi_0 + \Phi_L - d\Phi_0 \Phi_L$, $\Phi_L = \Phi_0 + (1 - d\Phi_0)\Phi_L$, $\Delta\Phi = (1 - d\Phi_0)\Delta\Phi_L$, where $\Phi$ is the optical power of the entire imaging lens assembly 20, where $\Phi_0$ is the optical power of the base lens 40, where $\Phi_L$ is the optical power of the liquid lens 54, where d is the distance between the base lens 40 and the liquid lens 54, where $\Delta\Phi$ is the desired optical power variation of the entire imaging lens assembly 20, and where $\Delta\Phi_L$ is the needed optical power variation of the liquid lens 54. Since $\Phi_0$ is positive and constant in general, it is necessary to minimize the distance or air gap between the base lens 40 and the liquid lens 54 in order to minimize $\Delta\Phi_L$ and, thus, minimize the voltage variation for the liquid lens 54 to achieve the desired auto-focusing depth of focus, especially as the liquid lens 54 ages over time.

Figure 6:
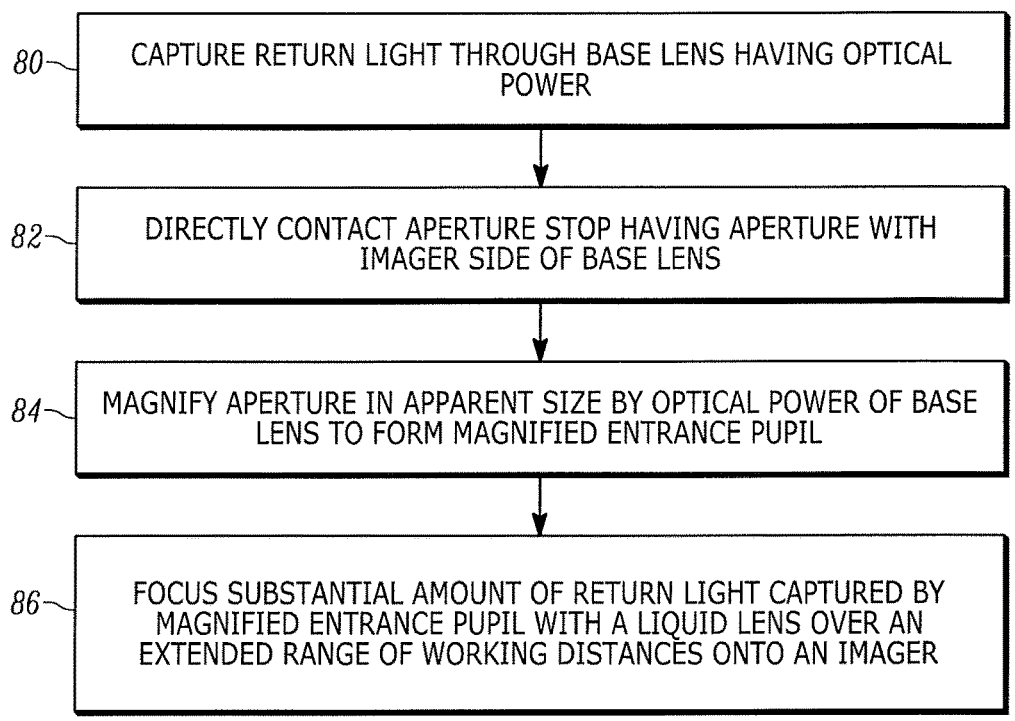
FIG. 6 is a flow chart depicting steps performed in a method in accordance with this disclosure.

FIG. 6 is a flow chart that depicts the method of imaging the target 38 to be electro-optically read by capturing return light from the target 38 over a field of view of an array of image sensors of a solid-state imager 24, and by projecting the captured return light onto the array. The method is performed by the step 80 of passing the captured return light along the optical axis 46 through the base lens 40 having an optical power, a target side facing the target 38, and an imager side facing the imager 24. The method is further performed by the step 82 of contacting the aperture stop 50 having the aperture 52 through which the optical axis 46 extends and the captured return light passes in direct surface area contact with the imager side of the base lens 40, and by the step 84 of magnifying the aperture 52 in apparent size by the optical power of the base lens 40 to form a magnified entrance pupil as seen through the target side. The method is still further performed by the step 86 of focusing, with a variable focus liquid lens 54, a substantial amount of the return light captured by the magnified entrance pupil over an extended range of working distances onto the imager 24.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging lens assembly for capturing return light from a target over a field of view of an array of image sensors of a solid-state imager, and for projecting the captured return light onto the array during electro-optical reading of the target, the assembly comprising:
   a base lens through which the captured return light passes along an optical axis, the base lens having an optical power, a target side facing the target, and an imager side facing the imager;
   an aperture stop in direct surface area contact with the imager side of the base lens and having an aperture through which the optical axis extends and the captured return light passes, the aperture being magnified in apparent size by the optical power of the base lens to form a magnified entrance pupil as seen through the target side; and
   a variable focus liquid lens arranged along the optical axis between the aperture stop and the imager for focusing a substantial amount of the return light captured by the magnified entrance pupil over an extended range of working distances onto the imager.

2. The assembly of claim 1, wherein the base lens has a first lens having a positive optical power, a second lens having a negative optical power, and a third lens having a positive optical power, and wherein the second lens is located between the first and third lenses.

3. The assembly of claim 2, wherein the first lens has a spherical surface, and wherein each of the second and third lenses has an aspherical surface.

4. The assembly of claim 2, wherein the first lens is constituted of a high index, low dispersion crown material, wherein the second lens is constituted of a high index, high dispersion flint material, and wherein the third lens is constituted of a low index, low dispersion crown material.

5. The assembly of claim 2, wherein each lens has at least one curved surface that bends toward the aperture stop and whose center of curvature is located at the same side of the aperture stop.

6. The assembly of claim 2, wherein the positive optical power of the first lens is between about 1 and about 1.2 times of the optical power of the imaging lens assembly, wherein the negative optical power of the second lens is between about −1.2 and about −1 times of the optical power of the imaging lens assembly, and wherein the positive optical power of the third lens is between about 1 and about 1.2 times of the optical power of the imaging lens assembly, for thermal and aberration compensation.

7. The assembly of claim 1, wherein the liquid lens is located close to the base lens with minimal spacing relative to the base lens, and wherein the liquid lens has a pair of light-transmissive liquids arranged along the optical axis, the liquids being immiscible, of different optical indicies of refraction, and of substantially same density, one of the liquids having a changeable shape for optically modifying the captured return light passing through said one liquid along the optical axis toward the imager.

8. The assembly of claim 1, and a dust cover glass arranged along the optical axis between the liquid lens and the imager and being remote from the imager.

9. An arrangement for imaging a target to be electro-optically read by image capture, comprising:
   a housing having a window;
   a solid-state imager in the housing and including an array of image sensors having a field of view; and
   an imaging lens assembly in the housing, for capturing return light over the field of view from the target through the window, and for projecting the captured return light onto the array during electro-optical reading of the target, the imaging lens assembly including
   a base lens through which the captured return light passes along an optical axis, the base lens having an optical power, a target side facing the target, and an imager side facing the imager;
   an aperture stop in direct surface area contact with the imager side of the base lens and having an aperture through which the optical axis extends and the captured return light passes, the aperture being magnified in apparent size by the optical power of the base lens to form a magnified entrance pupil as seen through the target side; and
   a variable focus liquid lens arranged along the optical axis between the aperture stop and the imager for focusing a substantial amount of the return light captured by the magnified entrance pupil over an extended range of working distances onto the imager.

10. The arrangement of claim 9, wherein the base lens has a first lens having a positive optical power, a second lens having a negative optical power, and a third lens having a positive optical power, and wherein the second lens is located between the first and third lenses.

11. The arrangement of claim 10, wherein the first lens has a spherical surface, and wherein each of the second and third lenses has an aspherical surface.

12. The arrangement of claim 10, wherein the first lens is constituted of a high index, low dispersion crown material, wherein the second lens is constituted of a high index, high dispersion flint material, and wherein the third lens is constituted of a low index, low dispersion crown material.

13. The arrangement of claim 10, wherein each lens has at least one curved surface that bends toward the aperture stop and whose center of curvature is located at the same side of the aperture stop.

14. The arrangement of claim 10, wherein the positive optical power of the first lens is between about 1 and about 1.2 times of the optical power of the imaging lens assembly, wherein the negative optical power of the second lens is between about −1.2 and about −1 times of the optical power of the imaging lens assembly, and wherein the positive optical power of the third lens is between about 1 and about 1.2 times of the optical power of the imaging lens assembly, for thermal and aberration compensation.

15. The arrangement of claim 9, wherein the liquid lens is located close to the base lens with minimal spacing relative to the base lens, and wherein the liquid lens has a pair of light-transmissive liquids arranged along the optical axis, the liquids being immiscible, of different optical indicies of refraction, and of substantially same density, one of the liquids having a changeable shape for optically modifying the captured return light passing through said one liquid along the optical axis toward the imager.

16. The arrangement of claim 9, and a dust cover glass arranged along the optical axis between the liquid lens and the imager and being remote from the imager.

17. The arrangement of claim 9, and an illuminating light assembly for illuminating the target with illumination light having a low brightness level due to the passage of the substantial amount of the return light captured by the magnified entrance pupil through the base lens and the liquid lens to the imager.

18. A method of imaging a target to be electro-optically read by capturing return light from the target over a field of view of an array of image sensors of a solid-state imager, and by projecting the captured return light onto the array, the method comprising:

passing the captured return light along an optical axis through a base lens having an optical power, a target side facing the target, and an imager side facing the imager;

contacting an aperture stop having an aperture through which the optical axis extends and the captured return light passes in direct surface area contact with the imager side of the base lens;

magnifying the aperture in apparent size by the optical power of the base lens to form a magnified entrance pupil as seen through the target side; and focusing, with a variable focus liquid lens, a substantial amount of the return light captured by the magnified entrance pupil over an extended range of working distances onto the imager.

19. The method of claim 18, and configuring the base lens as a plurality of lenses arranged along the optical axis.

20. The method of claim 18, and arranging a dust cover glass along the optical axis between the liquid lens and the imager, and locating the dust cover glass remotely from the imager.

* * * * *